(12) United States Patent
Yoo et al.

(10) Patent No.: US 8,176,209 B2
(45) Date of Patent: May 8, 2012

(54) DATA COMMUNICATION SYSTEM

(75) Inventors: Seung Mok Yoo, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 37 days.

(21) Appl. No.: 12/826,848

(22) Filed: Jun. 30, 2010

(65) Prior Publication Data

US 2011/0106979 A1 May 5, 2011

(30) Foreign Application Priority Data

Nov. 5, 2009 (KR) .................. 10-2009-0106271
Jun. 18, 2010 (KR) .................. 10-2010-0057901

(51) Int. Cl.
*G06F 3/00* (2006.01)
(52) U.S. Cl. .................. 710/5; 710/6; 710/7
(58) Field of Classification Search .................. None
See application file for complete search history.

(56) References Cited

U.S. PATENT DOCUMENTS

| 7,082,481 B2 * | 7/2006 | Lambrache et al. ............ 710/52 |
| 7,603,501 B2 * | 10/2009 | Hsieh et al. .................. 710/110 |
| 7,730,248 B2 * | 6/2010 | Goss et al. .................... 710/261 |
| 2002/0120795 A1 * | 8/2002 | Charlier ........................... 710/33 |
| 2007/0083491 A1 * | 4/2007 | Walmsley et al. ................. 707/3 |
| 2007/0136502 A1 * | 6/2007 | Wen et al. ...................... 710/110 |
| 2008/0165019 A1 * | 7/2008 | Tang et al. ..................... 340/602 |
| 2008/0183928 A1 * | 7/2008 | Devila et al. .................. 710/110 |
| 2009/0125657 A1 * | 5/2009 | Hsieh ............................. 710/110 |
| 2010/0191995 A1 * | 7/2010 | Levy et al. ..................... 713/323 |

FOREIGN PATENT DOCUMENTS

| CN | 200510010526 | * 11/2005 |
| CN | 1758622 A | 4/2006 |
| JP | 2005-196486 | 7/2005 |

OTHER PUBLICATIONS

Ken Dietz, "Interfacing SPI Serial EEPROMs to PIC16 Devices", 2005, Microchip Technology Inc. Microchip AN909.*
Seungmok Yoo, "H/W and S/W architectures for high-performance sensor nodes," KCC 2009 Workshop for New Information Communication Researchers, Jul. 1, 2009, 19 pages.

* cited by examiner

*Primary Examiner* — Henry Tsai
*Assistant Examiner* — Jing-Yih Shyu
(74) *Attorney, Agent, or Firm* — Staas & Halsey LLP

(57) ABSTRACT

A data communication system is provided. The data communication system includes a main processor, and at least one sub-processor or at least one peripheral device connected with the main processor according to a serial peripheral interface (SPI) method and performing an operation corresponding to a command transferred from the main processor. The connection according to the SPI method is made by one or more bus lines including a master in slave out (MISO) line and master out slave in (MOSI) line, a slave select (SS) line, an interrupt line, and a clock transfer line.

5 Claims, 2 Drawing Sheets

DATA COMMUNICATION SYSTEM

CROSS-REFERENCE TO RELATED APPLICATION

This application claims priority to and the benefit of Korean Patent Application No. 10-2009-0106271, filed Nov. 5, 2009 and Korean Patent Application No. 10-2010-0057901, filed Jun. 18, 2010, the disclosure of which is incorporated herein by reference in its entirety.

BACKGROUND

1. Field of the Invention

The present invention relates to a data communication system, and more particularly to a data communication system connecting multiple processors without additional hardware.

2. Discussion of Related Art

Lately, a lot of effort has been made to develop a high-performance sensor node for supporting complicated application programs of a wireless sensor network. In general, most sensor nodes use a single processor, and an 8-bit or 16-bit processor (e.g., ATMega128 or MSP430F1611) is mainly used as the single processor because low power consumption is considered as the first requirement. In some sensor nodes requiring high performance, a high-speed 16-bit or 32-bit single chip (e.g., OKI ML67Q5002 of XYZ) is also used.

In the meantime, a sensor node requiring very high performance is designed to use multiple processors. For example, a Low Power Energy Aware Processing (LEAP) sensor node includes MSP430 and PXA270 which are 16-bit processors, and a Power-Aware Sensing Tracking and Analysis (PASTA) sensor node includes 8-bit processors. In a LEAP sensor node, processors are simply connected, and there is no system bus. A PASTA sensor node provides some common interfaces but does not provide a system bus capable of simultaneously connecting a processor with peripheral devices.

As a multi-master serial bus, an inter-integrated circuit (I2C) is an interface currently capable of connecting a processor with devices and ensuring extensibility. However, most peripheral devices used in recent sensor nodes have a serial peripheral interface (SPI) alone, and thus it is difficult to connect a processor with the peripheral devices through the same interface. Also, an I2C interface supports a data transfer rate of 100 kbps in a standard mode, which is ten times or more slower than that of an SPI connection. Furthermore, an I2C interface has high power consumption, and it is difficult to use the I2C interface as a system bus for a low-power high-performance sensor node.

SUMMARY OF THE INVENTION

The present invention is directed to providing a system bus for communication between processors or between a processor and a peripheral device and for implementing a high-performance sensor node by multiple processors, and connecting processors in a master/slave scheme using a serial peripheral interface (SPI) method without additional hardware.

The present invention is also directed to initializing a state machine to operate only when processors are connected in the master/slave scheme and a command defined by a main processor is received, and thereby enabling low-power high-performance data communication.

One aspect of the present invention provides a data communication system including: a main processor; and at least one sub-processor or at least one peripheral device connected with the main processor according to an SPI method and performing an operation corresponding to a command transferred from the main processor. Here, the connection according to the SPI method is made by one or more bus lines, and the one or more bus lines include: a master in slave out (MISO) line and master out slave in (MOSI) line for data transfer; a slave select (SS) line for transferring a signal selecting one of the sub-processor and the peripheral device and switching the selected sub-processor or peripheral device to an operable state; an interrupt line branching from the SS line, and transferring the signal transferred through the SS line as a state machine initialization signal of the selected sub-processor or peripheral device; and a clock transfer line.

The one or more bus lines may further include a data-ready line for transferring a signal indicating that there is data to be transferred from the sub-processor or the peripheral device to the main processor.

The command may be one of "read", "write" and "exec" commands.

The "read" command may be transferred in a form "read (SPIdevID, addr, len, value)," and a sub-processor or peripheral device corresponding to an address "SPIdevID" may read a value "value" present at an address "addr" and having a length "len" when a command having the form is transferred. The "write" command may be transferred in a form "write (SPIdevId, addr, len, value)," and a sub-processor or peripheral device corresponding to an address "SPIdevId" may write a value "value" having a length "len" at an address "addr" when a command having the form is transferred. The "exec" command may be transferred in a form "exec(SPIdevId, command, paramlen, param)," and a sub-processor or peripheral device corresponding to an address "SPIdevId" may execute a service "command" with reference to a parameter "param" having a length "paramlen" when a command having the form is transferred.

The command may be transferred in a data format including a length of data in which a variable required for performing the operation is recorded, an operation code (opcode) in which the command is recorded, and the data.

The sub-processor or the peripheral device may transfer a data format including a length of a result value obtained by performing the operation and the result value to the main processor.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Constitution of Data Communication System

Figure 1:
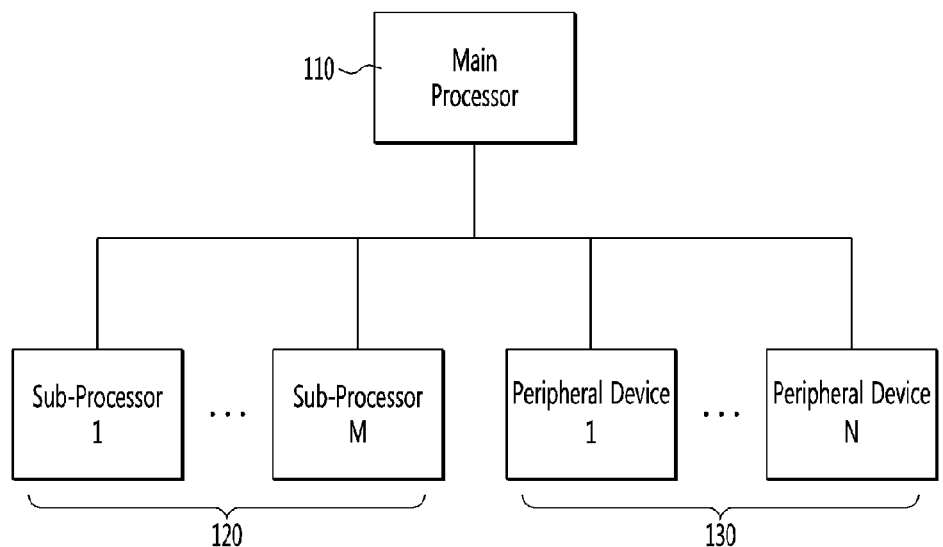
FIG. 1 is a block diagram of a data communication system according to an exemplary embodiment of the present invention.

FIG. 1 is a block diagram of a data communication system according to an exemplary embodiment of the present invention. The data communication system shown in FIG. 1 may be used in a sensor node, and also for another network communication.

Referring to FIG. 1, the data communication system according to an exemplary embodiment of the present invention may include a main processor 110, and a plurality of sub-processors 120 and a plurality of peripheral devices 130 connected in common to the main processor 110. As an example, the data communication system shown in FIG. 1 is constituted of one main processor 110, M sub-processors 120, and N peripheral devices 130. Also, the main processor 110 and the sub-processors 120 are separately shown for convenience, but processors having the same internal constitution may be used as the main processor 110 and the sub-processors 120.

The sub-processors 120 and the peripheral devices 130 may be connected with the main processor 110 by serial communication. According to an exemplary embodiment of the present invention, the serial communication may be in accordance with a serial peripheral interface (SPI) method.

Communication between the main processor 110 and the sub-processors 120 or between the main processor 110 and the peripheral devices 130 is performed according to a one-to-one communication method.

Figure 2:
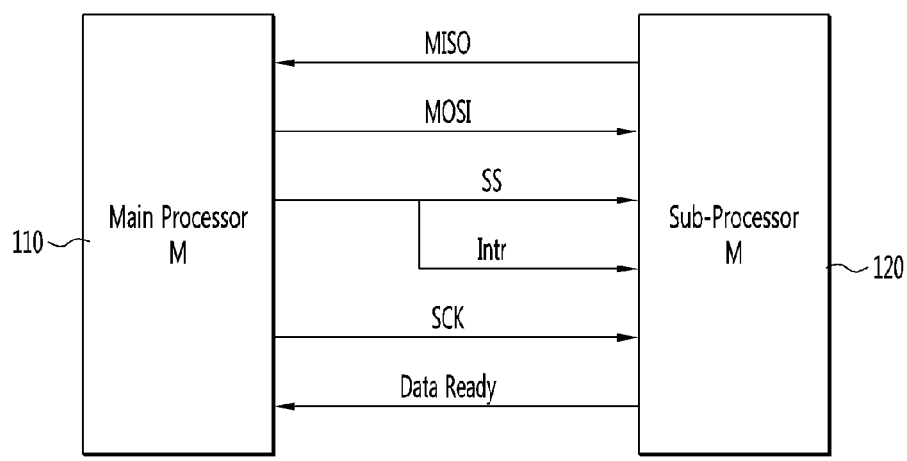
FIG. 2 is a block diagram illustrating connection between a main processor and a sub-processor or peripheral device according to an exemplary embodiment of the present invention.

FIG. 2 illustrates a communication method between a sub-processor 120 or a peripheral device 130 and the main processor 110 according to an exemplary embodiment of the present invention on the basis of hardware. Although FIG. 2 illustrates a case in which the main processor 110 and the sub-processor 120 are connected according to an SPI communication method, the main processor 110 and the peripheral device 130 also can be connected according to the same communication method.

Referring to FIG. 2, SPI communication between the main processor 110 and the sub-processor 120 can be performed through at least one line. At this time, the main processor 110 and the sub-processor 120 may be connected according to a master/slave communication method.

A master in slave out (MISO) line MISO and a master out slave in (MOSI) line MOSI are used for data transfer.

Meanwhile, the main processor 110 needs to select a communication target sub-processor or a communication target peripheral device 130 among the one or more sub-processors 120 or the one or more peripheral devices 130. A signal related to this selection is input to the selected sub-processor 120 or the selected peripheral device 130 through a slave select (SS) line SS. For example, when a specific sub-processor 120 is selected as a communication target by the main processor 120, the selection signal is input to the sub-processor 120 through the SS line SS, and the sub-processor 120 may become operable.

In an exemplary embodiment of the present invention, a signal input to the SS line SS may be split onto an interrupt line Intr, which is another line branching from the SS line SS, and input to the sub-processor 120 through another port. The signal input to the interrupt line Intr serves to switch the sub-processor 120 from a sleep state to a wake-up state, and may also serve to initialize an internal state machine of the sub-processor 120. In other words, when the SS signal is input, the sub-processor 120 is placed into the wake-up state, and its state machine is initialized and becomes operable.

When the MISO line MISO and the MOSI line MOSI, which can be referred to as data transfer bus, and the SS line SS, which can be referred to as address assignment bus, are connected between the main processor 110 and the sub-processor 120, a clock signal is supplied to the sub-processor 120 through a clock transfer line SCK. The clock signal indicates the timing of data transfer from the main processor 110 to the sub-processor 120. When there is data to be transferred from the sub-processor 120 to the main processor 110, a data-ready line Data Ready for transferring a signal indicating that there is data to be transferred from the sub-processor 120 to the main processor 110 may be additionally prepared. In other words, when there is data to be transferred to the main processor 110, the sub-processor 120 may transfer a signal corresponding to this case through the data-ready line Data Ready, and the main processor 110 may receive the signal according to a polling method, which is a software method of continuously checking whether or not a signal is received, or an interrupt method, which is a hardware method of only checking a change of a received signal. The data-ready line Data Ready may not be an essential component in an exemplary embodiment of the present invention.

As mentioned above, the communication method described with reference to FIG. 2 may be implemented in the same way between the main processor 110 and the peripheral device 130 as well as between the main processor 110 and the sub-processor 120.

It will be described in detail below how data and a command are transferred from the main processor 110 to the sub-processor 120 or the peripheral device 130.

Transfer of Data and Command

Figure 3:
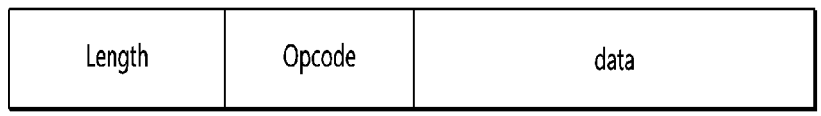
FIG. 3 shows the data frame format of a command transferred from a main processor according to an exemplary embodiment of the present invention.

FIG. 3 shows the data frame format of a command transferred from the main processor 110 to the sub-processor 120 or the peripheral device 130 according to an exemplary embodiment of the present invention.

Referring to FIG. 3, the main processor 110 transfers the length of data to be transferred, an operation code (opcode) which is a command, and the data in sequence.

The sub-processor 120 or the peripheral device 130 performs an operation corresponding to the command transferred in the form of the opcode on the data transferred from the main processor 110.

Table 1 below shows commands transferred from the main processor 110 to the sub-processor 120 or the peripheral device 130 and description of the commands.

TABLE 1

| Command | Parameter |
| --- | --- |
| read(SPIdevId, addr, len, value) | SPIdevId: device address in SPI bus<br>addr: address in SPIdevId device<br>len: length of data present at addr |

TABLE 1-continued

| Command | Parameter |
| --- | --- |
| | value: variable whereby data present at addr is stored and returned |
| write(SPIdevId, addr, len, value) | SPIdevId: device address in SPI bus<br>addr: address in SPIdevId device<br>len: length of data present at addr<br>value: variable indicating value to be written at addr |
| exec(SPIdevId, command, paramlen, param) | SPIdevId: device address in SPI bus<br>command: name of service to be executed in SPI device<br>paramlen: length of parameter<br>param: parameter required by command |

"read," "write," and "exec" commands instruct the sub-processor 120 or the peripheral device 130 to perform reading, writing, and execution, respectively.

Each of the commands corresponds to the opcode in FIG. 3. Each command causes the sub-processor 120 or the peripheral device 130 to perform an operation corresponding to the command on the data transferred following the opcode.

When a "read" command is received, the sub-processor 120 or the peripheral device 130 performs an operation of reading data. For example, when a "read(SPIdevId, addr, len, value)" command is received, the sub-processor 120 or the peripheral device 130 corresponding to an address "SPIdevId" reads a value "value" present at an address "addr" in the sub-processor 120 or the peripheral device 130 and having a length "len."

Also, when a "write" command is received, the sub-processor 120 or the peripheral device 130 performs an operation of writing data. For example, when a "write(SPIdevId, addr, len, value)" command is received, the sub-processor 120 or the peripheral device 130 corresponding to an address "SPIdevId" writes a value "value" at an address "addr" in the sub-processor 120 or the peripheral device 130 and having a length "len."

Meanwhile, when an "exec" command is received, the sub-processor 120 or the peripheral device 130 performs an operation of executing a predetermined service. For example, when an "exec(SPIdevId, command, paramlen, param)" command is received, the sub-processor 120 or the peripheral device 130 corresponding to an address "SPIdevId" execute a service "command" with reference to a parameter "param" having a length "paramlen."

For example, a command transferred from the main processor 110 to the sub-processor 120 or the peripheral device 130 may have the following frame format:

```
•Master → Slave
    if opcode == READ
        data:addr
    else if opcode == WRITE
        data: addr.value
    else if opcode == EXEC
        data: command.param
```

In other words, when an opcode is "read," an "addr" parameter may be recorded in successively transferred data. When an opcode is "write," "addr" and "value" parameters may be recorded in successively transferred data. When an opcode is "exec," "command" and "param" parameters may be recorded in successively transferred data.

However, the above-mentioned format is merely an example, and a command transferred from the main processor 110 may have another data frame format. For example, all of "addr," "len," and "value" parameters may be recorded in data transferred following an opcode "read."

It will be described below how a specific sub-processor 120 or a specific peripheral device 130 operates when the main processor 110 selects the sub-processor 120 or the peripheral device 130 and transfers a command.

State Machine

When the main processor 110 is connected with the sub-processor 120 or the peripheral device 130, the main processor 110 and the sub-processor 120 or the peripheral device 130 operate according to a client/server method based on software.

As mentioned above, the main processor 110 may select one of the sub-processors 120 or the peripheral devices 130. The selection can be performed by applying a selection signal to a specific sub-processor 120 or a specific peripheral device 130 through the SS line SS. The sub-processor 120 or the peripheral device 130 to which the selection signal is applied becomes operable. As mentioned above, the selection signal transferred through the SS line SS may be split and applied to the interrupt line Intr, and the split signal can initialize the state machine of the sub-processor 120 or the peripheral device 130. The initialization may be performed before a first valid byte is transferred from the main processor 110. The initialization based on the selection signal may be performed at the point in time when slave selection is started and at the point in time when slave selection is finished.

After the sub-processor 120 or the peripheral device 130 is selected, a command is transferred from the main processor 110 in the form shown in FIG. 3. Using its own state machine, the sub-processor 120 or the peripheral device 130 receiving the command checks whether or not transferred data is a valid frame, switches to a state corresponding to the received command to perform the corresponding routine, and transfers the result value to the main processor 110 according to the state machine.

Figure 4:
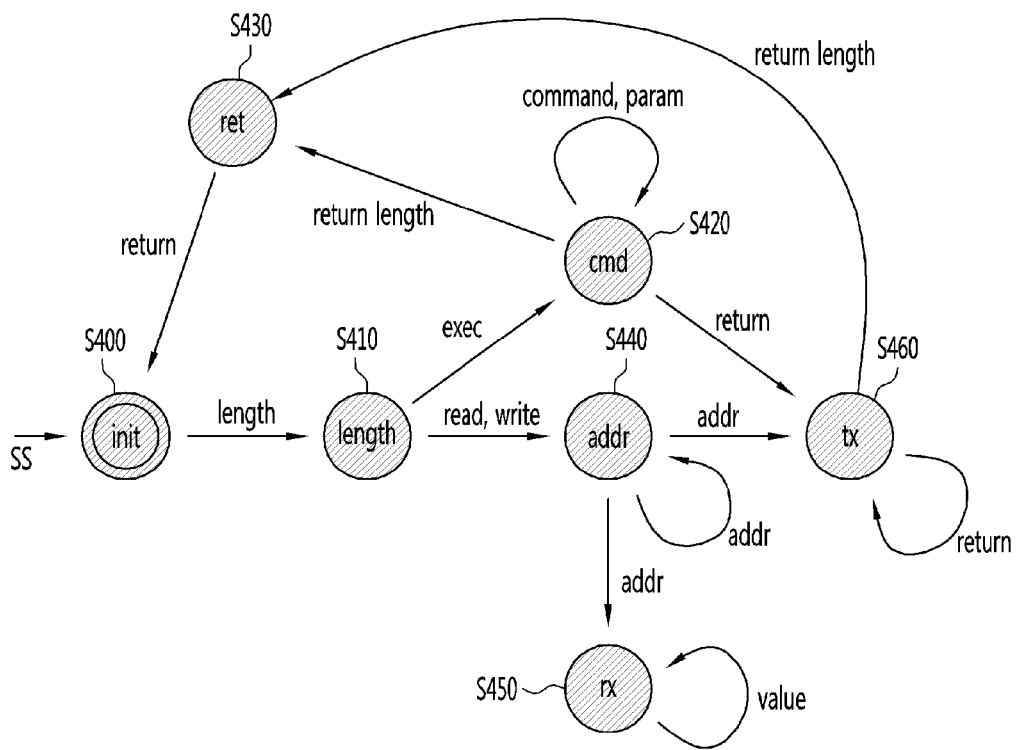
FIG. 4 shows an example of a state machine that a sub-processor or peripheral device according to an exemplary embodiment of the present invention has.

FIG. 4 shows an example of a state machine that the sub-processor 120 or the peripheral device 130 has.

Referring to FIG. 4, when a selection signal is transferred through the SS line SS, a state machine is initialized (S400). The length of data transferred from the main processor 110 may be fixed or variable. When the length of data is variable, the state machine receives information on the length of data, recognizes the length, and switches to a length state "length" (S410). After this, when a "exec" command is transferred from the main processor 110, the state machine switches to a command state "cmd" and executes a service corresponding to "command" with reference to a "param" parameter transferred with the command (S420). As mentioned above, "command" and "param" parameters can be transferred with "exec," more specifically, as data following the "exec" opcode. When a service execution result value is generated, the state machine transfers the length of the result value to the main processor 110, switches to a return state "ret" (S430), successively transfers the generated result value to the main processor 110, and then switches back to the initialization state "init" (S400). Meanwhile, when a "read" or "write" command is transferred from the main processor 110, the state machine switches from the length state "length" to an address state "addr" (S440). After this, the state machine switches to a receive state "rx," and reads a variable at the corresponding address or writes a variable at the corresponding address (S450). A variable to be read or written may be transferred with the command from the main processor 110. After performing the read or write operation, the state machine may switch to the initialization state "init" (S400).

The sub-processor 120 or the peripheral processor 110 may return a command transferred from the main processor 110, thereby informing the main processor 130 that the command is normally received. To be specific, when an "exec" command is received, the state machine switches from the command sate "cmd" to a transfer state "tx" for returning the received command (S460), transfers the length of return data, that is, the command transferred from the main processor 110, to the main processor 110, switches to the return state "ret" (S430), and then may successively return the corresponding data. At this time, the state machine may switch to the initialization state "init" (S400). Likewise, when a "read" or "write" command is received, the state machine switches to the transfer state "tx" (S460), transfers the length of the command transferred from the main processor 110 to the main processor 110, switches to the return state "ret" (S430), and then successively returns the corresponding data.

Meanwhile, in an exemplary embodiment of the present invention, the data-ready line Data Ready (see FIG. 2) may be connected between the main processor 110 and the sub-processor 120 or the peripheral device 130. In this case, the sub-processor 120 or the peripheral device 130 may transfer a data-ready signal to the main processor 110 through the data-ready line Data Ready, thereby informing the main processor 110 that there is data to be transferred. A signal transferred through the data-ready line Data Ready is reset after data is transferred to the main processor. As soon as the signal is reset, the sub-processor 120 or the peripheral device 130 checks whether there is data to be additionally transferred. When there is data to be additionally transferred, the sub-processor 120 or the peripheral device 130 may prepare the data for transfer and then transfer the data through the data-ready line Data Ready. On the other hand, the main processor 110 may check whether or not there is data to be transferred from the sub-processor 120 or the peripheral device 130 on the basis of a change of the signal transferred through the data-read line Data Ready.

Figure 5:
FIG. 5 shows a data frame format transferred from a sub-processor or peripheral device according to an exemplary embodiment of the present invention.

The sub-processor 120 or the peripheral device 130 may transfer data to the main processor 110 in a predetermined form. FIG. 5 shows a data frame format in which the sub-processor 120 or the peripheral device 130 transfers data to the main processor 110 according to an exemplary embodiment of the present invention.

Referring to FIG. 5, the sub-processor 120 or the peripheral device 130 may transfer the length of data to be transferred and a result value in sequence. The length of data to be transferred is the length of the result value, and the result value is obtained by performing the corresponding routine according to a command transferred from the main processor 110. In other words, the main processor 110 reads the length of the result value to be transferred by the sub-processor 120 or the peripheral device 130, and then reads data corresponding to the length. When there is no signal transferred through the data-ready line Data Ready, the main processor 110 may wait for a sufficient time for the sub-processor 120 or the peripheral device 130 to prepare a result value which will be transferred to the main processor 110, and then read data transferred in the data frame format shown in FIG. 5.

After reading all result values transferred from the sub-processor 120 or the peripheral device 130, the main processor 110 may reset a selection signal transferred through the SS line SS, thereby completing communication.

In an exemplary embodiment of the present invention, a high-performance sensor node can be implemented by multiple processors, and a data communication system can be implemented according to a master/slave scheme using the SPI method without additional hardware.

Also, in an exemplary embodiment of the present invention, a state machine is initialized to operate only when processors are connected in the master/slave scheme and a command defined by a main processor is received, and thus low-power high-performance data communication is enabled.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A data communication system, comprising:
   a main processor; and
   at least one sub-processor or at least one peripheral device connected with the main processor according to a serial peripheral interface (SPI) method, and performing an operation corresponding to a command transferred from the main processor,
   wherein the connection according to the SPI method is made by one or more bus lines, and
   the one or more bus lines include:
   a master in slave out (MISO) line and master out slave in (MOSI) line for data transfer;
   a slave select (SS) line for transferring a signal selecting one of the sub-processor or the peripheral device and switching the selected sub-processor or peripheral device to an operable state;
   an interrupt line branching from the SS line, and transferring the signal transferred through the SS line as wake-up signal and a state machine initialization signal of the selected sub-processor or peripheral device;
   a clock transfer line; and
   wherein the one or more bus lines further include a data-ready line for transferring a signal indicating that there is data to be transferred from the sub-processor or the peripheral device to the main processor.

2. The data communication system of claim 1, wherein the command is one of "read", "write" and "exec" commands.

3. The data communication system of claim 2, wherein the "read" command is transferred in a form "read(SPldevID, addr, len, value)," and a sub-processor or peripheral device corresponding to an address "SPldevID" reads a value "value" present at an address "addr" and having a length "len" when a command having the form is transferred,
   the "write" command is transferred in a form "write (SPldevld, addr, len, value)," and a sub-processor or peripheral device corresponding to an address "SPldevld" writes a value "value" having a length "len" at an address "addr" when a command having the form is transferred, and
   the "exec" command is transferred in a form "exec(SPldevld, command, paramlen, param)," and a sub-processor or peripheral device corresponding to an address "SPldevld" executes a service "command" with reference to a parameter "param" having a length "paramlen" when a command having the form is transferred.

4. The data communication system of claim 1, wherein the command is transferred in a data format including a length of data in which a variable required for performing the operation is recorded, an operation code (opcode) in which the command is recorded, and the data.

5. The data communication system of claim 1, wherein the sub-processor or the peripheral device transfers a data format including a length of a result value obtained by performing the operation and the result value to the main processor.

* * * * *